United States Patent
Chen et al.

(10) Patent No.: US 10,352,705 B2
(45) Date of Patent: Jul. 16, 2019

(54) POSITIONING METHOD FOR OBTAINING AT LEAST ONE UNDERWATER POSITION OF A POSITIONING SYSTEM

(71) Applicant: Deepblu Inc., Taipei (TW)

(72) Inventors: Hung-Ru Chen, Taipei (TW); You-Yu Chang, Taipei (TW)

(73) Assignee: DEEPBLU INC., Taipei (TW)

( * ) Notice: Subject to any disclaimer, the term of this patent is extended or adjusted under 35 U.S.C. 154(b) by 439 days.

(21) Appl. No.: 15/339,320

(22) Filed: Oct. 31, 2016

(65) Prior Publication Data

US 2018/0120113 A1 May 3, 2018

(51) Int. Cl.
*G01C 21/20* (2006.01)

(52) U.S. Cl.
CPC .................................... *G01C 21/20* (2013.01)

(58) Field of Classification Search
None
See application file for complete search history.

(56) References Cited

U.S. PATENT DOCUMENTS

| | | | | |
|---|---|---|---|---|
| 3,469,821 A | * | 9/1969 | Gross | B66D 1/48 114/245 |
| 5,042,156 A | * | 8/1991 | Huddle | G01C 21/10 33/321 |
| 5,676,576 A | * | 10/1997 | Shonting | B63G 8/38 441/1 |
| 6,016,763 A | * | 1/2000 | Takahashi | B63C 11/42 114/312 |
| 6,961,657 B1 | * | 11/2005 | Wemli | G01C 21/005 367/131 |
| 9,250,082 B2 | * | 2/2016 | Frizlen | B63B 21/22 |
| 9,739,901 B2 | * | 8/2017 | Marc | G01V 1/3852 |
| 10,054,104 B1 | * | 8/2018 | Cote | F03B 13/20 |
| 2003/0010112 A1 | * | 1/2003 | Yekutiely | G01F 23/0023 73/290 R |
| 2005/0052951 A1 | * | 3/2005 | Ray | G01V 1/166 367/188 |
| 2009/0135022 A1 | * | 5/2009 | Hollis | B63C 11/26 340/850 |
| 2011/0292202 A1 | * | 12/2011 | Tanaka | G01S 19/49 348/81 |

(Continued)

FOREIGN PATENT DOCUMENTS

| | | | | |
|---|---|---|---|---|
| DE | 102008019444 A1 | * | 10/2009 | ........... G01C 21/165 |
| WO | WO-2009127429 A2 | * | 10/2009 | ........... G01C 21/165 |
| WO | WO-2011020096 A1 | * | 2/2011 | ............. G01C 21/06 |

*Primary Examiner* — Shelley Chen
(74) *Attorney, Agent, or Firm* — Brinks Gilson & Lione

(57) ABSTRACT

A positioning method includes the steps of: obtaining a first geographic coordinate set of a first geographic position at water level in a geographic coordinate system; after a positioning system dives into water at the first geographic position, measuring acceleration in the geographic coordinate system for a predetermined time duration; calculating a displacement vector of the positioning system during the predetermined time duration; calculating an estimated coordinate set of an underwater position of the positioning system according to the displacement vector and using the first geographic coordinate set as an initial point; and outputting the estimated coordinate set to indicate the underwater position of the positioning system.

20 Claims, 6 Drawing Sheets

(56) References Cited

U.S. PATENT DOCUMENTS

| | | | |
|---|---|---|---|
| 2013/0144558 A1* | 6/2013 | Hollis | G06F 17/40 |
| | | | 702/187 |
| 2013/0257621 A1* | 10/2013 | Juergensen | B63C 11/02 |
| | | | 340/626 |
| 2014/0198607 A1* | 7/2014 | Etienne | G01V 1/3852 |
| | | | 367/15 |
| 2016/0084696 A1* | 3/2016 | Lin | G01F 23/68 |
| | | | 340/623 |
| 2016/0178993 A1* | 6/2016 | Bianciardi | A01K 91/06 |
| | | | 348/81 |
| 2016/0195626 A1* | 7/2016 | Rinnan | G01V 1/3835 |
| | | | 367/17 |

* cited by examiner

FIG.7

POSITIONING METHOD FOR OBTAINING AT LEAST ONE UNDERWATER POSITION OF A POSITIONING SYSTEM

FIELD

The disclosure relates to a method for obtaining at least one underwater position of a positioning system.

BACKGROUND

Conventionally, positioning of an object, such as an electronic device, may be done using an ordinary global positioning system (GPS) device installed in the object. In some cases, it may be desirable to position an underwater object (e.g., a camera device worn by a diver or an underwater device). Specifically, it may be desirable to keep track of the location of the object in a three-dimensional coordinate system.

However, it is known that the GPS device is unable to communicate properly with a GPS satellite when underwater.

SUMMARY

An object of the disclosure is to provide a positioning method for obtaining at least one underwater position of a system.

According to one embodiment of the disclosure, the positioning method for obtaining at leas t one underwater position is implemented by a positioning system that includes an accelerometer and a processor. The positioning method includes the steps of:

a) obtaining, by the processor, a first geographic coordinate set of a first geographic position at water level in a geographic coordinate system;

b) after the positioning system dives into water at the first geographic position, continuously measuring, by the accelerometer, acceleration in the geographic coordinate system for a predetermined time duration counting from an instant when the position system dives into water;

c) calculating, by the processor, a displacement vector of the positioning system during the predetermined time duration based on the acceleration;

d) calculating, by the processor, an estimated coordinate set of an underwater position of the positioning system in the geographic coordinate system according to the displacement vector calculated in step c) and using the first geographic coordinate set as an initial point of the displacement vector; and e) outputting, by the processor, the estimated coordinate set to indicate the underwater position of the positioning system.

Another object of the disclosure is to provide a positioning system that is capable of implementing the above-described method.

According to one embodiment of the disclosure, the positioning system is for obtaining at least one underwater position, and includes:

an accelerometer programmed to continuously measure acceleration in the geographic coordinate system for a predetermined time duration after the positioning system dives into water at a first geographic position; and a processor coupled to the accelerometer, and programmed to obtain a first geographic coordinate set of the first geographic at water level in the geographic coordinate system, calculate a displacement vector of the positioning system during the predetermined time duration based on the acceleration, calculate an estimated coordinate set of a underwater position of the positioning system in the geographic coordinate system, according to the displacement vector thus calculated and the first geographic coordinate set, and output the estimated coordinate set to indicate the underwater position of the positioning system.

BRIEF DESCRIPTION OF THE DRAWINGS

Other features and advantages of the disclosure will become apparent in the following detailed description of the embodiments with reference to the accompanying drawings, of which:

FIG. 7 illustrates an image frame of the image file after operations of FIG. 6 are implemented.

DETAILED DESCRIPTION

Figure 1:
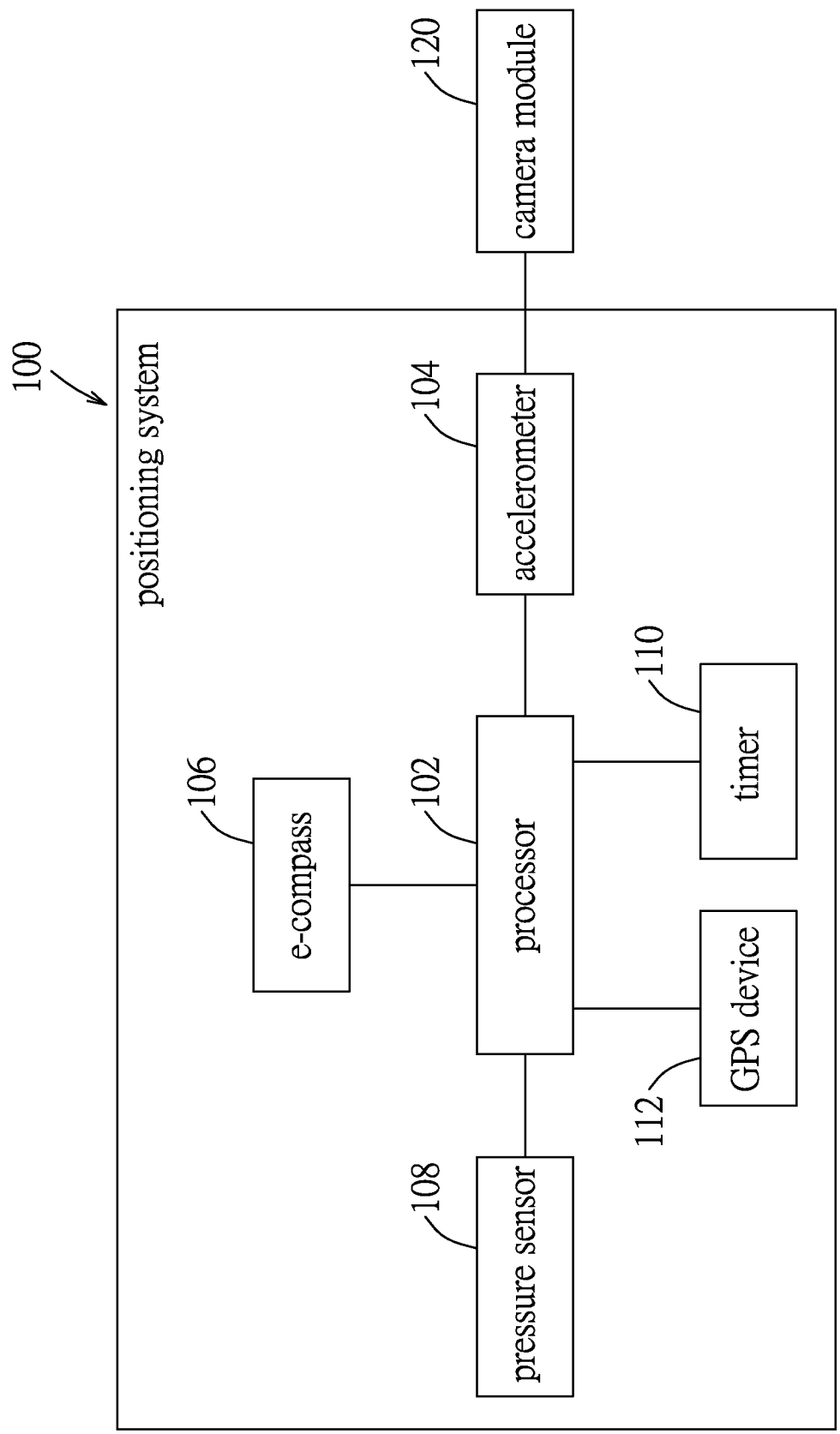
FIG. 1 is a block diagram illustrating a positioning system according to one embodiment of the disclosure.

FIG. 1 is a block diagram illustrating a positioning system 100, according to one embodiment of the disclosure.

The positioning system 100 includes a processor 102, an accelerometer 104, an e-compass 106, a pressure sensor 108, a timer 110 and a global positioning system (GPS) device 112. In this embodiment, the positioning system 100 is a device wearable by a person diving underwater, and components thereof may be integrated as a system on chip (SoC).

In this embodiment, the positioning system 100 may be configured to communicate with a camera module 120. In this embodiment, the camera module 120 is a camera array that includes a plurality of cameras disposed at various angles with respect to the positioning system 100, in order to cooperatively record an image file from multiple angles. In one embodiment, the image file is a 360-degree video.

When the positioning system 100 is activated and is above a water level, the GPS device 112 is capable of obtaining a location of the positioning system 100. The location of the positioning system 100 may be expressed in the form of a geographic coordinate set. For instance, when the positioning system 100 is worn by a person diving in the sea, the water level may be the sea level.

The accelerometer 104 is capable of continuously detecting acceleration of the positioning system 100 in three-dimension. In this embodiment, the accelerometer 104 may be embodied using a 6-axis accelerometer.

The processor 102 is capable of calculating a displacement of the positioning system 100 based on the acceleration detected by the accelerometer 104. In particular, acceleration of the positioning system 100 for a time duration may be detected by the accelerometer 104. Afterward, the processor 102 is capable of performing an integral operation on the acceleration detected during the time duration in order to obtain the displacement.

Moreover, when an initial position of the positioning system 100 is known, the processor 102 is further capable of calculating an updated position of the positioning system 100, according to the displacement and the initial position. In this embodiment, the updated position of the positioning system 100 is in a form of a geographic coordinate set in a three-axis coordinate space.

The e-compass 106 is capable of detecting an orientation of the positioning system 100 when activated.

The pressure sensor 108 is capable of successively sensing pressure (e.g., underwater pressure).

Figure 2:
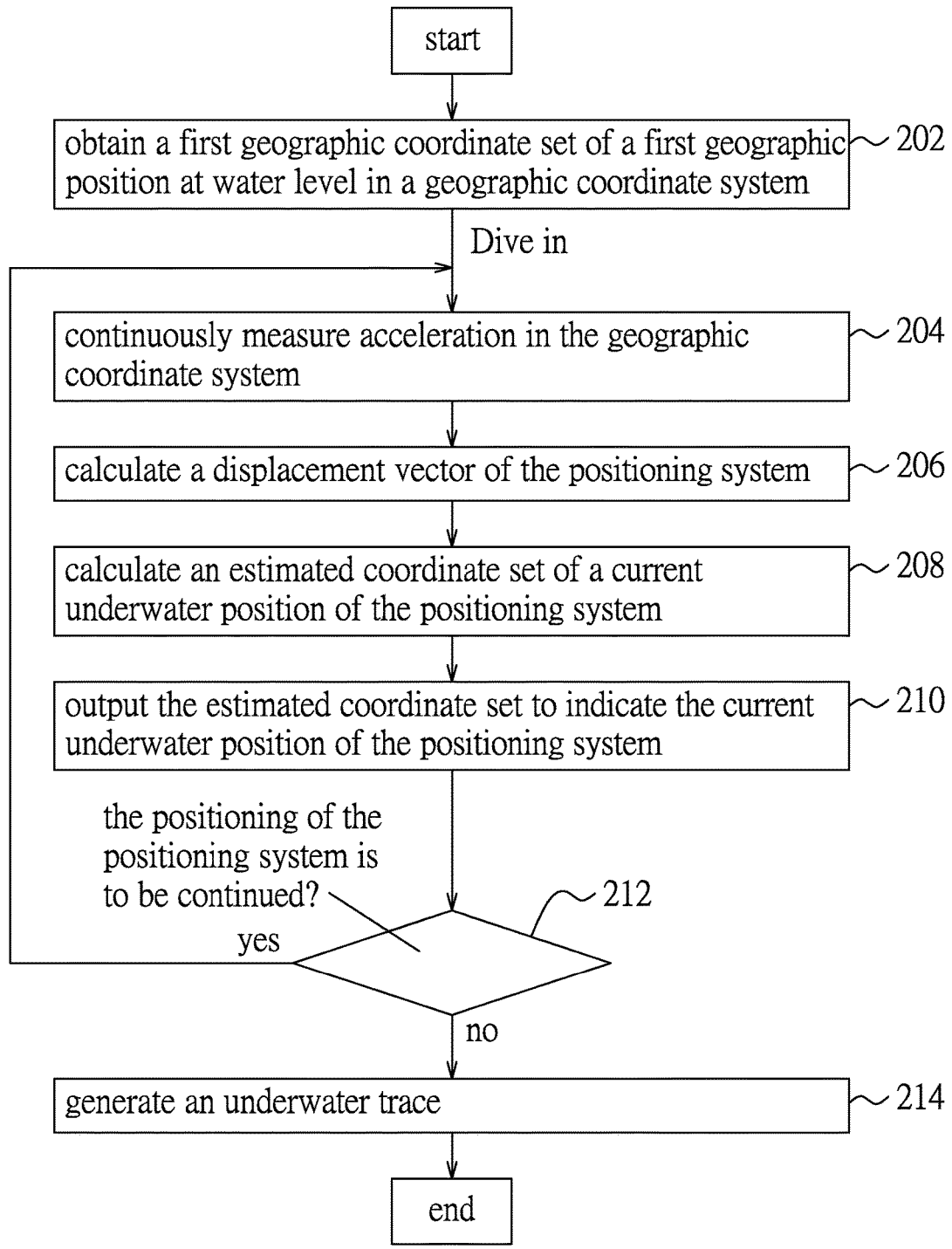
FIG. 2 is a flow chart illustrating steps of a positioning method implemented by the positioning system of FIG. 1, according to one embodiment of the disclosure.
Figure 3:
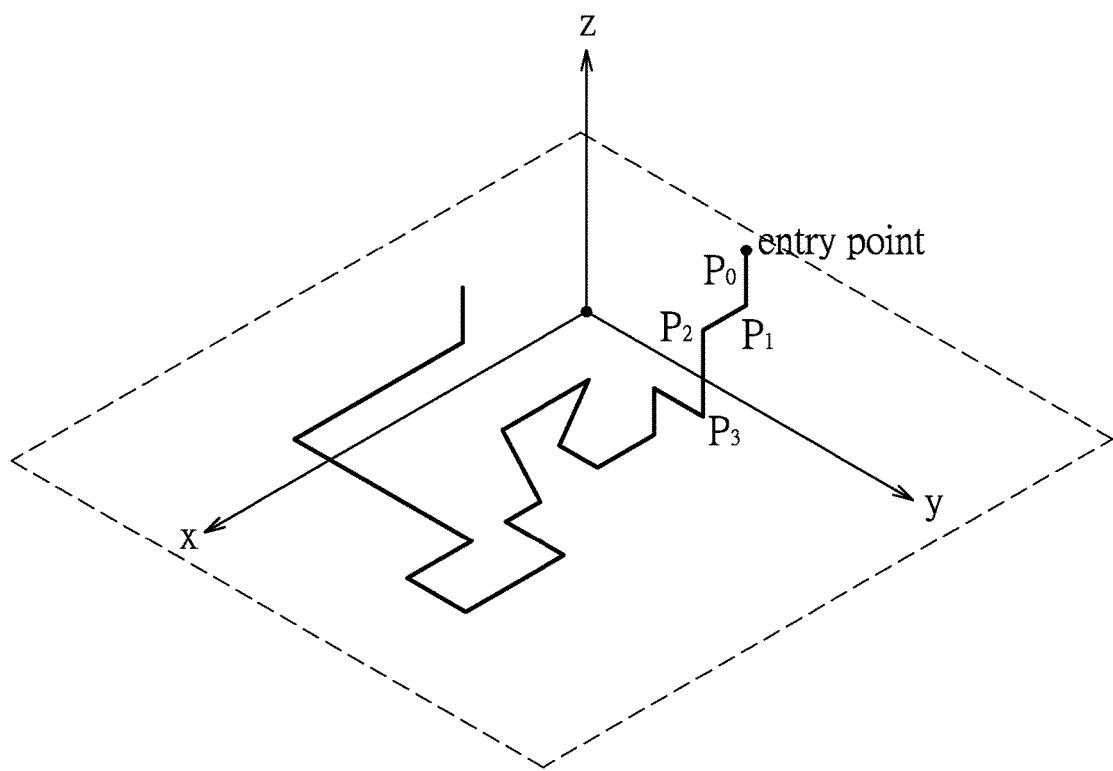
FIG. 3 illustrates a geographic coordinate system and an underwater trace of the positioning system.

Referring to FIGS. 2 and 3, a method for obtaining at least one underwater position implemented by the positioning system 100 according to one embodiment of the disclosure is illustrated. In this embodiment, the positioning system 100 is embodied using a device wearable by a diver and/or connectable to a diving tank. When the positioning system 100 is above water, the GPS device 112 is capable of continuously obtaining a geographic position of the positioning system 100. On the other hand, when the positioning system 100 goes underwater, the method is implemented to repeatedly obtain an estimation of an underwater position of the positioning system 100 without the use of the GPS device 112.

In step 202, the GPS device 112 obtains a first geographic coordinate set of a first geographic position (P0) at water level in a geographic coordinate system. This first geographic position is associated with the "initial position" of the positioning system 100 as described above. That is to say, the last one of the geographic position obtained by the GPS device 112 before the positioning system 100 moves underwater is deemed as the first geographic position.

In step 204, after the positioning system 100 dives into water at the first geographic position (the "entry point" as shown in FIG. 3), the GPS device 112 provides the first geographic coordinate set to the processor 102, and the accelerometer 104 is programmed to continuously measure acceleration in the geographic coordinate system for a predetermined time duration counting from an instant when the position system 100 dives into water.

In this embodiment, the predetermined time duration may be set at 10 milliseconds.

In step 206, the processor 102 calculates a displacement vector of the positioning system 100 during the predetermined time duration based on the acceleration obtained continuously by the accelerometer 104 during the predetermined time duration. This may be done using an integration operation.

In step 208, the processor 102 calculates an estimated coordinate set of a current underwater position of the positioning system 100 in the geographic coordinate system according to the displacement vector calculated in step 206 and using the first geographic coordinate set ($P_0$) as an initial point of the displacement vector.

Afterward, in step 210, the processor 102 outputs the estimated coordinate set to indicate the current underwater position of the positioning system 100.

In this embodiment, the operation of obtaining the estimated coordinate set may be performed repeatedly, in order to obtain a plurality of estimated coordinate sets for multiple consecutive time durations, as indicated by the points $P_1$, $P_2$, ..., $P_n$ in FIG. 3.

Specifically, in step 212, the processor 102 determines whether the positioning of the positioning system 100 is to be continued. Such a task may be done, for example, by the GPS device 112 to attempt establishing a communication with a GPS satellite. When the attempt is unsuccessful, the processor 102 may determine that the positioning system 100 is still underwater and the positioning of the positioning system 100 is to be continued, and the flow goes back to step 204 to repeat the operation for obtaining another underwater position. It should be noted that steps 204-212 are repeated for another predetermined time duration immediately following a previous predetermined time duration by using the estimated coordinate set calculated in a previous execution of step 206 as the initial point of the displacement vector so as to obtain another estimated coordinate set corresponding to the another underwater position. For example, the estimated coordinate set of the point $P_1$ is calculated in a first execution of step 208 according to the displacement vector $\overrightarrow{P_0P_1}$ and using the first geographic coordinate set ($P_0$) as the initial point of the displacement vector $\overrightarrow{P_0P_1}$, and similarly, the estimated coordinate set of the point $P_2$ is calculated in a second execution of step 208 according to the displacement vector $\overrightarrow{P_1P_2}$ and using the estimated coordinate set of the point $P_1$ as the initial point of the displacement vector $\overrightarrow{P_1P_2}$.

In another example, the commencement and termination of operation for obtaining underwater position point(s) may be manually controlled by a user.

When it is determined that the positioning of the positioning system 100 is not to be continued (and a plurality of underwater positions have been recorded), in step 214, the processor 102 is programmed to generate an underwater trace, as indicated by the line connecting the points in FIG. 3.

In one embodiment, when it is noticed by the processor 102 that the positioning system 100 rises to the water level, the GPS device 112 becomes available again, and is capable of obtaining a second geographic coordinate set of a second geographic position (which corresponds to the "exit point" as illustrated in FIG. 3).

Afterward, the processor 102 may be programmed to generate the underwater trace which starts from the first geographic position and ends at the second geographic position by connecting the estimated coordinate sets and the first and second geographic coordinate sets.

Figure 4:
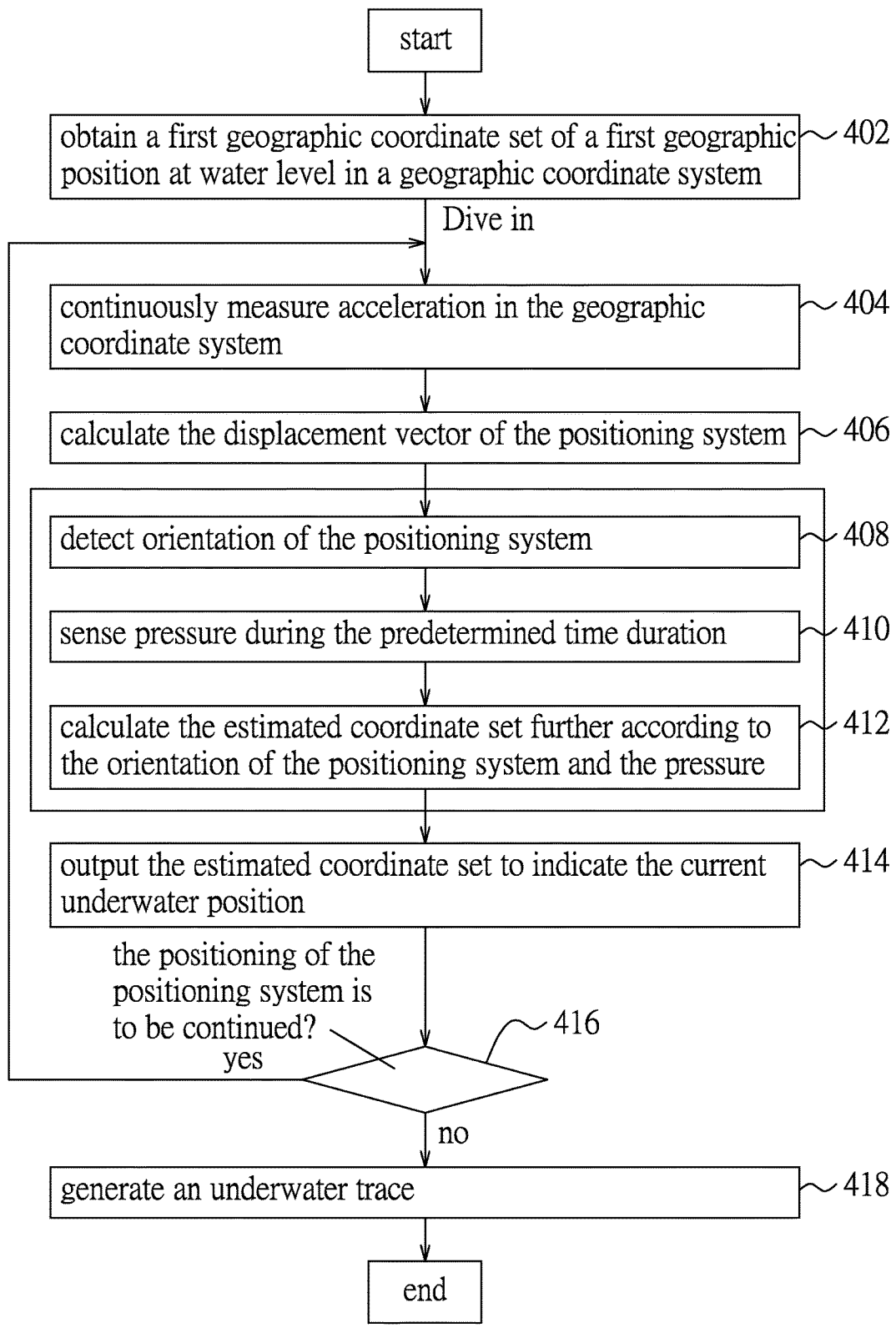
FIG. 4 is a flow chart illustrating steps of a positioning method implemented by the positioning system of FIG. 1, according to one embodiment of the disclosure.

FIG. 4 illustrates steps of a method for obtaining at least one underwater position to be implemented by a positioning system, according to one embodiment of the disclosure.

It is noted that, in this embodiment, multiple sensing elements may be employed for cooperatively obtaining a relatively more accurate estimation of the position of the positioning system 100 underwater.

Specifically, while the accelerometer 104 is primarily used for calculating the displacement, the e-compass 106 may be employed simultaneously for providing an orientation of the positioning system 100, in order to obtain a more accurate estimation for the displacement. The pressure sensor 108 may similarly be employed for providing a depth estimation.

Specifically, after the GPS device 112 obtains the first geographic coordinate set of the first geographic position ($P_0$) in step 402 and the positioning system 100 dives into water at the first geographic position ($P_0$), the accelerometer 104 continuously measures acceleration in the geographic coordinate system for the predetermined time duration in step 404.

Afterward, in step 406, the processor 102 calculates the displacement vector of the positioning system 100 during the predetermined time duration, based on the acceleration obtained by the accelerometer 104.

In step 408, the e-compass 106 detects orientation of the positioning system 100 during the predetermined time duration after the positioning system 100 dives into water at the first geographic position ($P_0$).

In step 410, the pressure sensor 108 senses pressure during the predetermined time duration. It should be noted that steps 404-410 may be implemented simultaneously.

Then, in step 412, the processor 102 calculates the estimated coordinate set further according to the orientation of the positioning system 100 detected by the e-compass 106 and the pressure detected by the pressure sensor 103. In one embodiment, the e-compass 106 may continuously detect the orientation of the positioning system 100 during the pressure during the predetermined time duration, and only the detection result at the end of the predetermined time duration is considered by the processor 102 for the calculation of the estimated coordinate set. Similarly, the pressure sensor 108 may continuously or periodically sense the pressure during the predetermined time duration, and only the pressure sensed at or nearest the end of the predetermined time duration is considered by the processor 102 for the calculation of the estimated coordinate set.

Specifically, the estimated coordinate set includes three components (x, y, z), each corresponding with an estimated latitude coordinate, an estimated longitude coordinate, and an estimated depth coordinate of the current position of the positioning system 100. The orientation detected by the e-compass 106 may be employed to adjust the latitude and the longitude, and the pressure detected by the pressure sensor 103 may be employed to adjust the depth of the positioning system 100. It is noted that the estimated depth coordinate may be a z-axis coordinate in the geographic coordinate system corresponding to an underwater depth of the underwater position.

It is noted that, however, accuracy of the e-compass 106 may be compromised when the e-compass 106 is placed at a tilt angle (with respect to an imaginary horizontal plane parallel to the water level). As a result, before the orientation detected by the e-compass 106 can be employed, a tilt compensation operation may be performed.

Figure 5:
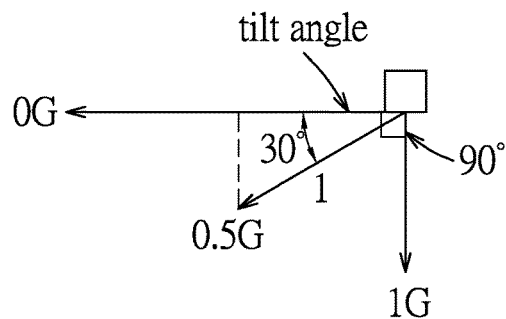
FIG. 5 illustrates using an accelerometer to detect a tilt angle of the positioning system.

At first, the tilt angle of the positioning system 100 may be detected by the accelerometer 104. As shown in FIG. 5, the accelerometer 104 may detect accelerations on both the imaginary horizontal plane in the geographic coordinate system, and along an imaginary vertical axis perpendicular to the imaginary horizontal plane in the geographic coordinate system.

When the positioning system 100 is in a stationary state (i.e., only subject to the force of gravity), the accelerometer 104 horizontally placed should detect only the gravity acceleration of 1G, with no force exerted on the imaginary horizontal plane.

On the other hand, when the positioning system 100, as well as the accelerometer 104, is tilted, the acceleration detected by the accelerometer 104 may be split into two components, one on the imaginary horizontal plane and the other along the imaginary vertical axis. For example, when the accelerometer 104 detects a downward acceleration of 0.78G in the stationary state, it may be implied that the accelerometer 104 is tilted at a tilt angle of 30 degrees.

Alternatively, when the accelerometer 104 detects a downward acceleration of 0.5G in the stationary state, it may be implied that the accelerometer 104 is tilted at a tilt angle of 60 degrees. Afterward, the processor 102 compensates the orientation of the positioning system 100 detected by the e-compass 106 according to the tilt angle before performing step 412 for calculating the estimated coordinate set. It is noted that the operations regarding the tilt angle compensation may be readily appreciated by ones skilled in the art, and details thereof are omitted herein for the sake of brevity.

Moreover, the pressure sensor 108 may continuously sense the pressure, and transmit the sensed pressure to the processor 102 periodically in step 410. Then, in step 412, the processor 102 calculates a calculated depth according to the sensed pressure received from the pressure sensor 108.

Specifically, the processor 102 may calculate the calculated depth according to the pressure once every preset adjustment interval (e.g., one minute). For instance, while the pressure sensor 108 may continually sense the pressure, only the pressure sensed every one minute apart is transmitted to the processor 102 for the purpose of calculating the calculated depth.

After the above operations, in step 412, in addition to the estimated coordinate set, the processor 102 is programmed to calculate a corrected latitude coordinate and a corrected longitude coordinate of the current underwater position on the imaginary horizontal plane in the geographic coordinate system based on the orientation of the positioning system 100, the tilt angle, and the displacement vector. The processor 102 may further calculate a corrected depth coordinate based on the calculated depth.

Then, the processor 102 replaces the estimated latitude coordinate and the estimated longitude coordinate of the estimated coordinate set by the corrected latitude and longitude coordinates, and replaces the estimated depth coordinate by the corrected depth coordinate. As a consequence, the estimated coordinate set generated by the processor 102 by the end of these operations in step 412 would be constituted by the corrected latitude, longitude and depth coordinates.

Afterward, in step 414, the processor 102 outputs the estimated coordinate set to indicate the current underwater position of the positioning system 100.

In step 416, the processor 102 determines whether the positioning of the positioning system 100 is to be continued. When the determination is affirmative, the flow goes back to step 404. Otherwise, the flow proceeds to step 418, in which the processor 102 generates the underwater trace by connecting a plurality of underwater positions obtained thus far. It should be noted that steps 404-416 are repeated for another predetermined time duration immediately following a previous predetermined time duration by using the estimated coordinate set calculated in a previous execution of step 412 as the initial point of the displacement vector so as to obtain another estimated coordinate set of another underwater position.

Figure 6:
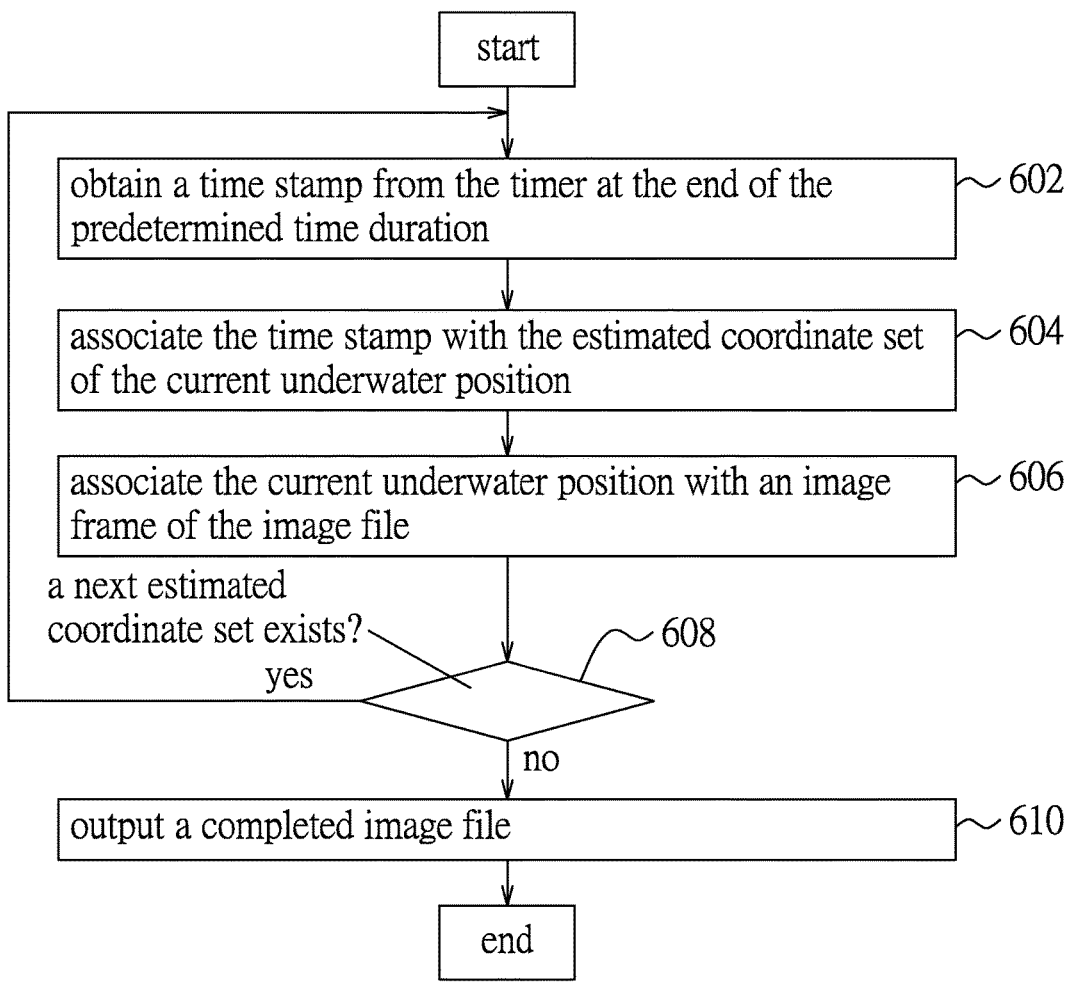
FIG. 6 is a flow chart illustrating associating a number of estimated coordinate sets respectively with a number of image frames of an image file, according to one embodiment of the disclosure.

In one embodiment of the disclosure, the underwater trace created by the above method may be utilized in connection with the image file generated by the camera module 120. Specifically, each estimated coordinate set obtained in the positioning method may be incorporated in the image file, using the time instance at which the estimated coordinate set is obtained. FIG. 6 illustrates such operations according to one embodiment of the disclosure. It is noted that the operations are done by the processor 102, and the camera module 120 is active when the positioning system 100 dives into water (i.e., the camera module 120 is in a process of recording images that constitute an image file).

In step 602, the processor 102 obtains a time stamp from the timer 110 at the end of the predetermined time duration.

At that time instance, the estimated coordinate set of the current underwater position is obtained. Then, in step 604, the processor 102 associates the time stamp with the estimated coordinate set of the current underwater position.

Figure 7:
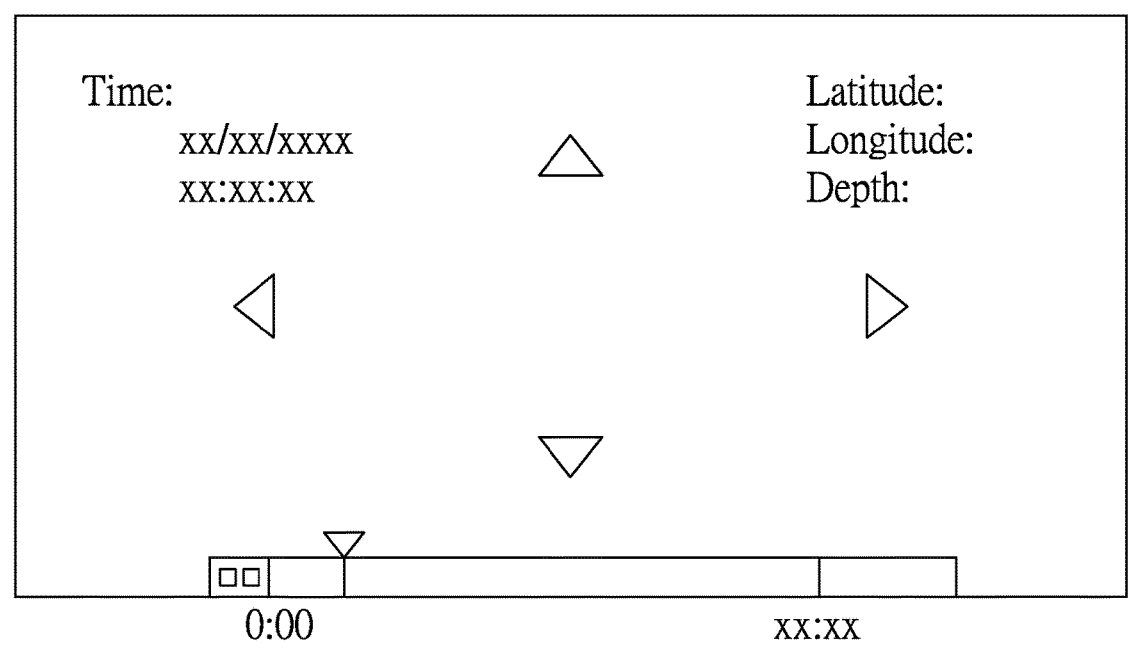

Then, in step 606, the processor 102 associates the current underwater position with an image frame of the image file, where that the image frame is recorded at a time point corresponding to the time stamp associated to the estimated coordinate set of the current underwater position. As shown in FIG. 7, when the image file is viewed later, the current underwater position (including latitude, longitude and depth) may be displayed at the corresponding time point.

In step 608, the processor 102 determines whether a next estimated coordinate set exists. When the determination is affirmative, the flow goes back to step 602 for another estimated coordinate set. Otherwise, the flow proceeds to step 610, in which the processor 102 outputs a completed image file that incorporates all the available estimated coordinate set(s) therein.

To sum up, the positioning system 100 and positioning method as described in the embodiments of the disclosure provide a way for obtaining a more accurate estimation of a position of the positioning system 100 that is underwater.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A positioning method for obtaining at least one underwater position to be implemented by a positioning system that includes an accelerometer and a processor, the positioning method comprising the steps of:
   a) obtaining, by the processor, a first geographic coordinate set of a first geographic position at water level in a geographic coordinate system;
   b) after the positioning system dives into water at the first geographic position, continuously measuring, by the accelerometer, acceleration in the geographic coordinate system for a predetermined time duration counting from an instant when the position system dives into water;
   c) calculating, by the processor, a displacement vector of the positioning system during the predetermined time duration based on the acceleration;
   d) calculating, by the processor, an estimated coordinate set of an underwater position of the positioning system in the geographic coordinate system according to the displacement vector calculated in step c) and using the first geographic coordinate set as an initial point of the displacement vector; and
   e) outputting, by the processor, the estimated coordinate set to indicate the underwater position of the positioning system.

2. The positioning method of claim 1, the positioning system further including an e-compass, wherein:
   the method further comprises the step of detecting, by the e-compass, orientation of the positioning system during the predetermined time duration after the positioning system dives into water at the first geographic position; and
   in step d), the processor calculates the estimated coordinate set further according to the orientation of the positioning system detected by the e-compass.

3. The positioning method of claim 2, wherein in step d), the processor is programmed to:
   calculate a corrected latitude coordinate and a corrected longitude coordinate of the underwater position on an imaginary horizontal plane parallel to the water level in the geographic coordinate system based on the orientation of the positioning system and the displacement vector; and
   replace an estimated latitude coordinate and an estimated longitude coordinate of the estimated coordinate set by the corrected latitude and longitude coordinates.

4. The positioning method of claim 2, further comprising the steps of:
   detecting, by the accelerometer, a tilt angle of the positioning system; and
   compensating, by the processor, the orientation of the positioning system detected by the e-compass according to the tilt angle before step d).

5. The positioning method of claim 1, the system further including a pressure sensor, the method further comprising the steps of:
   sensing pressure, by the pressure sensor; and
   calculating, by the processor, a corrected depth coordinate according to the pressure;
   wherein in step d), the processor replaces an estimated depth coordinate of the estimated coordinate set by the corrected depth coordinate.

6. The positioning method of claim 1, wherein, steps b) to d) are repeated for another predetermined time duration immediately following a previous predetermined time duration by using the estimated coordinate set calculated in a previous execution of step d) as the initial point of the displacement vector so as to obtain another estimated coordinate set of another underwater position.

7. The positioning method of claim 6, further comprising, after step d), the step of:
   generating, by the processor, an underwater trace by connecting the estimated coordinate sets.

8. The positioning method of claim 6, further comprising the steps of:
   obtaining a second geographic coordinate set of a second geographic position where the positioning system rises to the water level in the geographic coordinate system; and generating, by the processor, an underwater trace which starts from the first geographic position and ends at the second geographic position by connecting the estimated coordinate sets and the first and second geographic coordinate sets.

9. The positioning method of claim 1, the positioning system further including a timer, wherein the positioning method further comprises, before step e), the steps of obtaining a time stamp by the timer, and associating the time stamp with the estimated coordinate set by the processor.

10. The positioning method of claim 9, the system being coupled to a camera module that records an image file, the method further comprising, after step e), the step of associating the underwater position to an image frame of the image file that is recorded at a time point corresponding to the time stamp associated with the estimated coordinate set of the underwater position.

11. A positioning system for obtaining at least one underwater position, comprising:
an accelerometer programmed to continuous y measure acceleration in a geographic coordinate system for a predetermined time duration after the positioning system dives into water at a first geographic position; and
a processor coupled to said accelerometer, and programmed to
obtain a first geographic coordinate set of the first geographic at water level in the geographic coordinate system,
calculate a displacement vector of the positioning system during the predetermined time duration based on the acceleration,
calculate an estimated coordinate set of an underwater position of the positioning system in the geographic coordinate system, according to the displacement vector thus calculated and the first geographic coordinate set, and
output the estimated coordinate set to indicate the underwater position of the positioning system.

12. The positioning system of claim 11, further comprising an e-compass coupled to said processor and programmed to detect orientation of the positioning system during the predetermined time duration after the positioning system dives into water at the first geographic position,
wherein, said processor is programmed to calculate the estimated coordinate set further according to the orientation of the positioning system detected by said e-compass.

13. The positioning system of claim 12, wherein said processor is programmed to:
calculate a corrected latitude coordinate and a corrected longitude coordinate of the underwater position on an imaginary horizontal plane parallel to the water level in the geographic coordinate system based on the orientation of the positioning system and the displacement vector; and
replace an estimated latitude coordinate and an estimated longitude coordinate of the estimated coordinate set by the corrected latitude and longitude coordinates.

14. The positioning system of claim 12, wherein said accelerometer is further programmed to detect a tilt angle of the positioning system, and said processor is further programmed to compensate the orientation of the positioning system detected by said e-compass according to the tilt angle before calculating the estimated coordinate set.

15. The positioning system of claim 11, further comprising a pressure sensor coupled to said processor and programmed to sense pressure,
wherein said processor is further programmed to calculate a corrected depth coordinate according to the pressure, and to replace an estimated depth coordinate of the estimated coordinate set by the corrected depth coordinate.

16. The positioning system of claim 11, wherein said accelerometer and said processor are programmed to obtain a plurality of estimated coordinate sets.

17. The positioning system of claim 16, wherein said processor is further programmed to generate an underwater trace by connecting the plurality of estimated coordinate sets.

18. The positioning system of claim 16, wherein said processor is further programmed to:
obtain a second geographic coordinate set of a second geographic position where said positioning system rises to the water level in the geographic coordinate system; and
generate an underwater trace which starts from the first geographic position and ends at the second geographic position by connecting the plurality of estimated coordinate sets and the first and second geographic coordinate sets.

19. The positioning system of claim 11, further comprising a timer, wherein:
said processor is further programmed to obtain a time stamp from said timer, and to associate the time stamp with the estimated coordinate set.

20. The positioning system of claim 19, which is coupled to a camera module that records an image file, wherein said processor is further programmed to associate the underwater position to an image frame of the image file, where the image frame is recorded at a time point corresponding to the time stamp associated to the estimated coordinate set of the underwater position.

* * * * *